US008361266B2

(12) United States Patent
Colchiesqui

(10) Patent No.: US 8,361,266 B2
(45) Date of Patent: Jan. 29, 2013

(54) LAYERED MOLDING PROCESS FOR PRODUCING THREE DIMENSIONAL OBJECTS

(76) Inventor: Alexandre Viana Colchiesqui, São Paulo (BR)

( * ) Notice: Subject to any disclaimer, the term of this patent is extended or adjusted under 35 U.S.C. 154(b) by 205 days.

(21) Appl. No.: 13/025,877

(22) Filed: Feb. 11, 2011

(65) Prior Publication Data

US 2012/0121835 A1    May 17, 2012

Related U.S. Application Data

(60) Provisional application No. 61/413,503, filed on Nov. 15, 2010.

(51) Int. Cl.
*B29C 47/02* (2006.01)
*B29C 47/04* (2006.01)
*B32B 27/06* (2006.01)
*B32B 37/06* (2006.01)
*B32B 37/10* (2006.01)
*B32B 37/14* (2006.01)
*B32B 37/26* (2006.01)
*B32B 38/14* (2006.01)
*B32B 37/16* (2006.01)
*B32B 38/16* (2006.01)

(52) U.S. Cl. .................. 156/245; 156/242; 156/244.13; 156/244.16; 156/244.27; 156/289

(58) Field of Classification Search .................. 156/242, 156/244.13, 289, 244.16, 244.27, 245
See application file for complete search history.

(56) References Cited

U.S. PATENT DOCUMENTS

| 4,202,663 | A | * | 5/1980 | Haigh et al. ...................... 8/471 |
| 5,102,597 | A | * | 4/1992 | Roe et al. ........................ 264/126 |
| 5,129,979 | A | * | 7/1992 | Nakayama et al. ............ 156/294 |
| 5,290,490 | A | * | 3/1994 | Nied et al. ..................... 264/491 |
| 6,524,419 | B1 | * | 2/2003 | Dabrowski et al. ........... 156/230 |
| 7,323,251 | B2 | * | 1/2008 | Saitou ............................ 428/480 |
| 2002/0157758 | A1 | * | 10/2002 | Ickinger .......................... 156/77 |
| 2003/0035917 | A1 | * | 2/2003 | Hyman ............................ 428/67 |

* cited by examiner

*Primary Examiner* — Sonya Mazumdar
(74) *Attorney, Agent, or Firm* — Mark Terry

(57) ABSTRACT

A fabrication method for producing a hollow three dimensional object is disclosed. The method includes disposing a layer of adhesive over a top surface of an elastic material, disposing a layer of fabric to the top surface of the elastic material, such that the layer of adhesive secures the layer of fabric to the elastic material, applying a silkscreen stencil to the outward facing side of the layer of fabric, applying printable material to the outward facing side of the layer of fabric via the silkscreen stencil, applying heat to set the printable material to the layer of fabric, pressing an inside surface of a mold against the top surface of the elastic material, so as to produce a first three-dimensional object having an open end and removing excess elastic material from a rim of the open end of the first three-dimensional object.

19 Claims, 3 Drawing Sheets

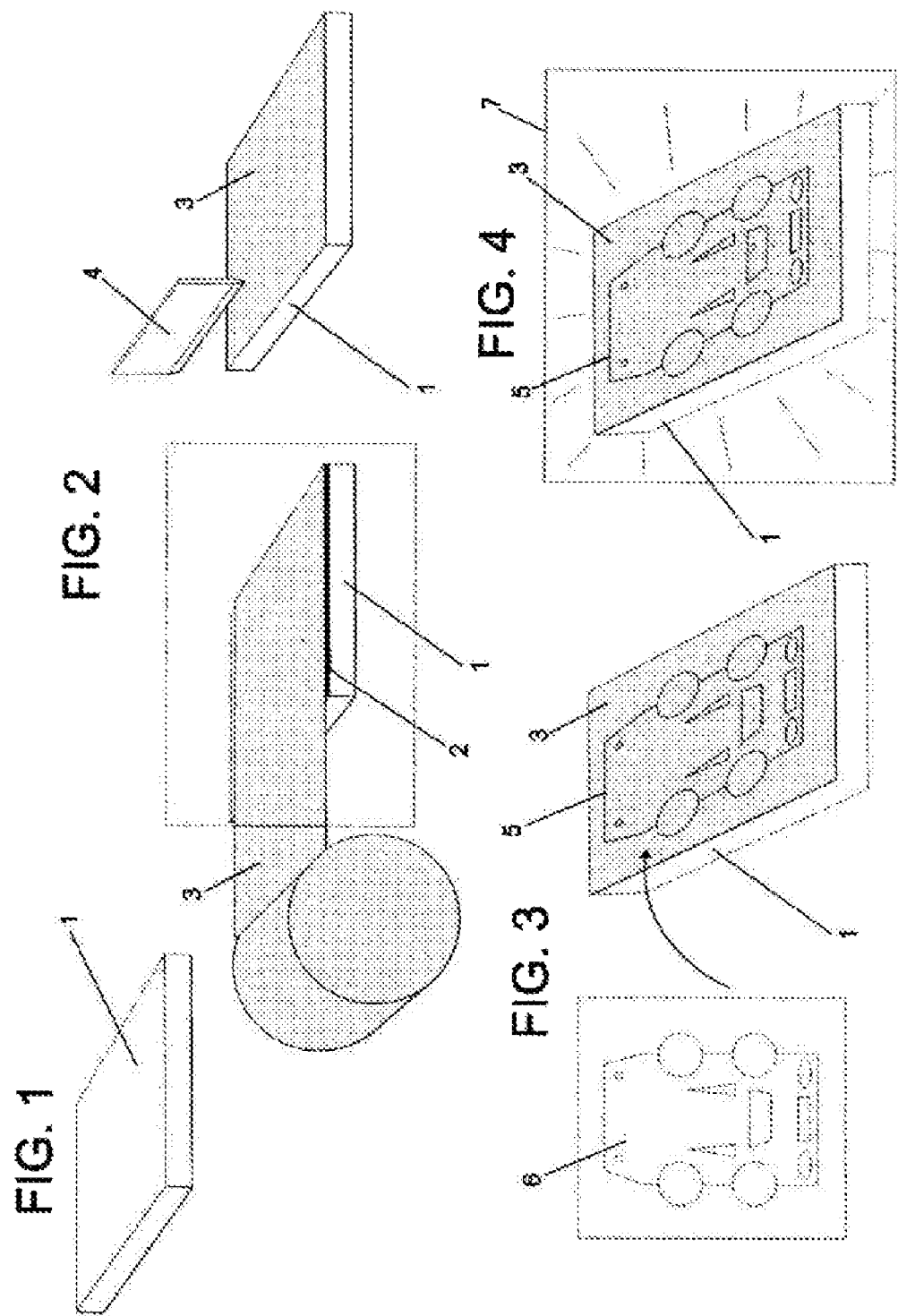

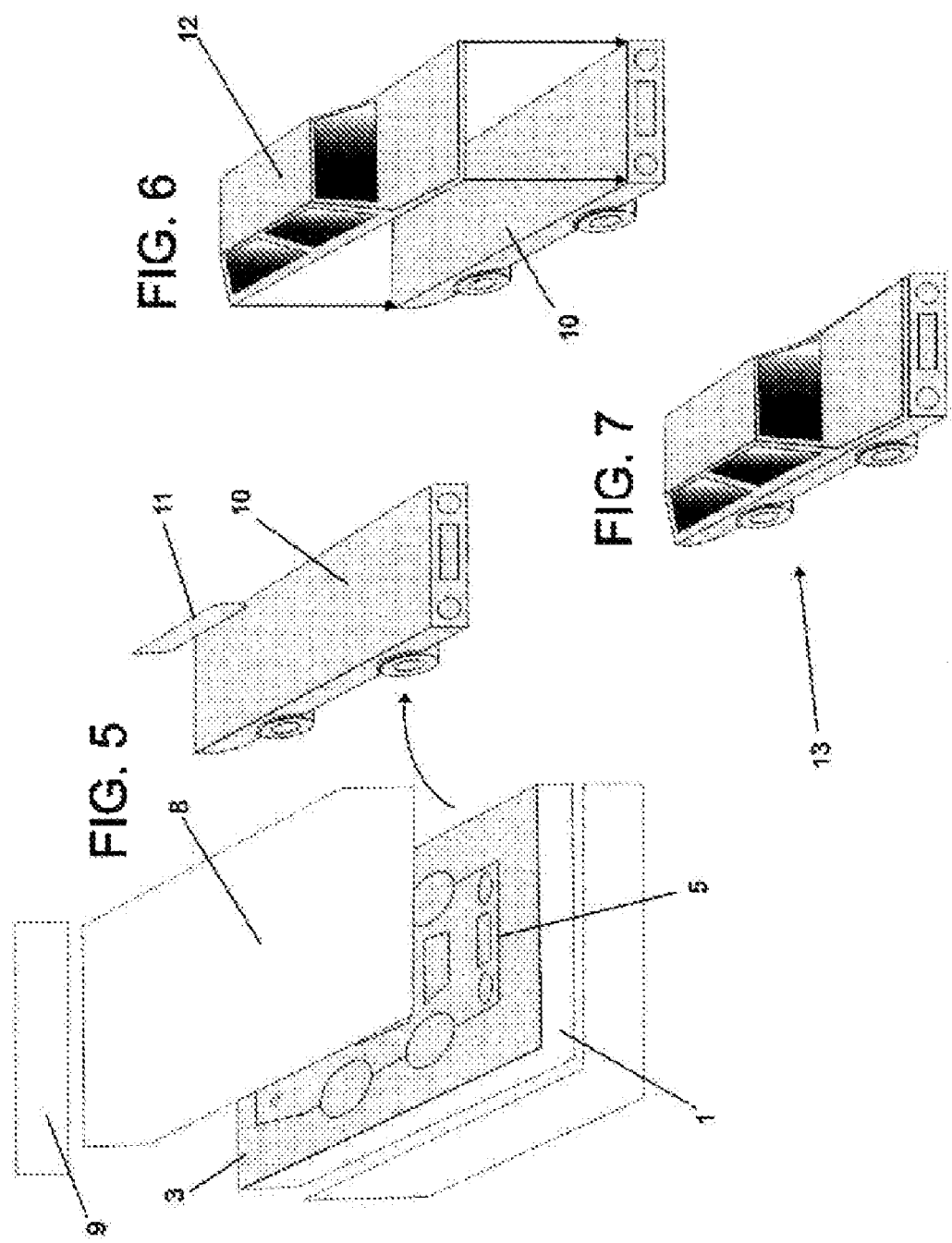

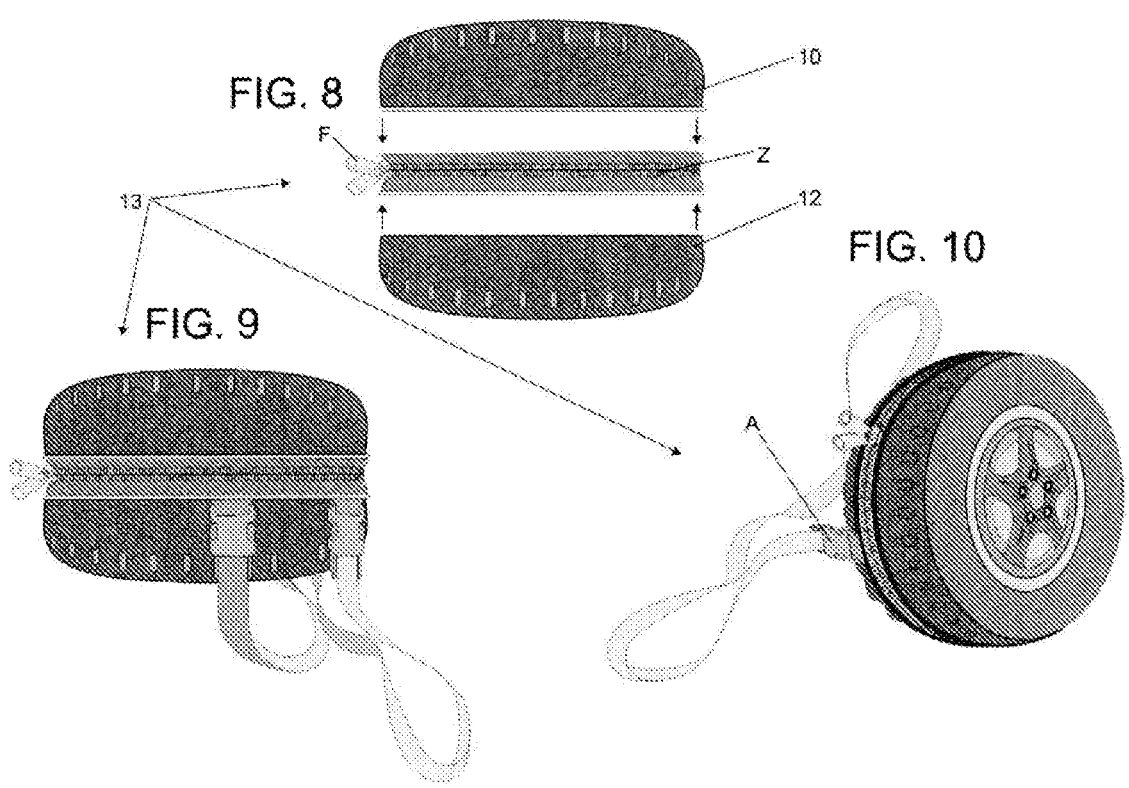

LAYERED MOLDING PROCESS FOR PRODUCING THREE DIMENSIONAL OBJECTS

CROSS-REFERENCE TO RELATED APPLICATIONS

This patent application claims priority to provisional patent application No. 61/413,503 filed on Nov. 15, 2010. The subject matter of provisional patent application No. 61/413, 503 is hereby incorporated by reference in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

This invention relates to field of manufacturing, and more particularly relates to the field of mold-based manufacturing of three dimensional objects.

BACKGROUND OF THE INVENTION

The simplest method of forming a stylized, three-dimensional object, such as a lunchbox in the shape of a car, is simply to shape the lunchbox out of a suitable material, such as plastic. Once the shape of the object has been developed, any desired texture or art work, such as paint, may be added to the object's exterior. Thus, for example, many lunchboxes and other three-dimensional objects are formed by simply molding a plastic or latex material to a detailed three-dimensional surface and painting the convex exterior of the three-dimensional surface using a silk screening or similar process.

Early lunchboxes and other three-dimensional objects were formed from plastic, with engravings or other art work added to the exterior of the lunchbox for additional artistic effect. This task, however, has been greatly simplified in recent years with the advent of plastics and other synthetic compounds. Such material may be suitably molded and dried, producing the desired three-dimensional object, such as a car. Other materials require a precipitated chemical reaction during the molding process, to produce a rigid material from one that was originally soft or liquid. Alternatively, many such plastics exist as hard, rigid materials at room temperature, and are heated to allow the material to be deformed, and then cooled so that the deformed material regains its rigidity as a molded three-dimensional object. These processes are currently used to manufacture a vast number of goods used in contemporary living.

It is not uncommon for art work seen upon the exterior of the plastic to be added either before or after the molding process has been completed. These newer procedures generally employ a silk screen or lithographic process to apply the desired art work to flat sheets of plastic prior to molding. These procedures have enabled near-effortless production of thousands of identical products, using assembly-line techniques. For example, a particular lithographic or silk-screen design may be repeatedly used many thousands of times, assisted by automated vacuum-forming machinery, which rapidly molds and cuts the desired stylized, three-dimensional object from rolls of plastic.

However, the foregoing procedures are not without their limitations. In particular, the use of plastics, rubber and similar manufacturing materials involve difficulties associated with the necessity to melt the material into a liquid at a high temperature. In these cases, the associated manufacturing machines involve a high amount of maintenance and repairs. Additionally, dealing with potentially-hazardous, liquid manufacturing materials can involve spills, contamination and other undesirable situations. In addition, the heat-treatment of pre-stylized materials, such as plastics, results in distortion of the printed image during the deformation process. Thus, creating the silk screen and lithographic designs involves some labor in predicting and accounting for distortion in the actual design itself, so that the finished product accurately bears the desired art work. Furthermore, the foregoing procedures are limited to plastic molding processes. As consumers become more sophisticated, there is an increased need to mold products from alternative materials.

From the foregoing, it will be apparent that there exists a definite need for an apparatus and method which allows the practical, low-cost production of stylized, three-dimensional objects in a variety of materials.

SUMMARY OF THE INVENTION

Briefly, in accordance with one embodiment of the present invention, a fabrication method for producing a hollow three dimensional object is disclosed. The method includes disposing a layer of adhesive over a top surface of an elastic material, disposing a layer of fabric to the top surface of the elastic material, such that the layer of adhesive secures the layer of fabric to the elastic material, applying a silkscreen stencil to the outward facing side of the layer of fabric, applying printable material to the outward facing side of the layer of fabric via the silkscreen stencil, applying heat to set the printable material to the layer of fabric, pressing an inside surface of a mold against the top surface of the elastic material, so as to produce a first three-dimensional object having an open end and removing excess elastic material from a rim of the open end of the first three-dimensional object. A hollow three-dimensional product produced using the process defined above is also disclosed.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

FIG. 1 is an illustration of a block of elastic material prepared for the manufacturing process, in accordance with one embodiment of the present invention.

FIG. 2 is an illustration of the process for applying a layer of fabric to the block of elastic material, in accordance with one embodiment of the present invention.

FIG. 3 is an illustration of the process for applying a graphic to the layer of fabric, in accordance with one embodiment of the present invention.

FIG. 4 is an illustration of the process for setting the print on the layer of fabric, in accordance with one embodiment of the present invention.

FIG. 5 is an illustration of the process for applying the mold to the block of elastic material, in accordance with one embodiment of the present invention.

FIG. 6 is an illustration of the process for coupling one three-dimensional object with another, in accordance with one embodiment of the present invention.

FIG. 7 is an illustration of the final product resulting from coupling one three-dimensional object with another, in accordance with one embodiment of the present invention.

FIG. 8 is an illustration of a side view of the final product resulting from the process of one embodiment of the present invention.

FIG. 9 is an illustration of an additional side view of the product of FIG. 8.

FIG. 10 is an illustration of a perspective view of the product of FIG. 8.

DETAILED DESCRIPTION

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawing like numerals refer to like parts through several views.

The present invention, according to a preferred embodiment, overcomes problems with the prior art by providing an efficient and simple mold-manufacturing method for fabricating a three dimensional object from a variety of materials including an elastic foam material covered in a graphic-printed polyester material. The present invention further solves problems with the prior art by providing a mold-manufacturing method that does not require the use of liquids or other difficult-to-use materials. The use of elastic materials such as ethylene vinyl acetate (EVA) allows the present invention to provide a manufacturing method that eliminates the need for materials such as rubber and plastic that must be melted in order to mold them. Further, the present invention solves problems with the prior art by providing method for manufacturing a three-dimensional object that is elastic and non-rigid. This allows the manufacturer to provide a product that is versatile in its use.

Lastly, the present invention improves over the prior art by reducing or eliminating distortion of the printed image on the manufactured product during the deformation process. Thus, the silk screen and/or lithographic designs printed on the final product are produced with a minimum of labor in predicting and accounting for distortion in the printed design itself. That is, the present invention allows the finished product to accurately bear the desired art work in a non-labor-intensive manner.

FIG. 1 is an illustration of a block of elastic material 1 prepared for the manufacturing process, in accordance with one embodiment of the present invention. The block of elastic material 1 may comprise a substantial thickness so as to allow for the molding process, such as thermoforming. The elastic material may be a polymer, an elastic foam material, ethylene vinyl acetate (EVA), expanded rubber, foam rubber, any combination of the above or the like. Block of elastic material 1 may include one or more layers of elastic material that may be combined with other materials or layers of other types.

FIG. 2 is an illustration of the process for applying one or more layers of fabric 3 to the block of elastic material 1, in accordance with one embodiment of the present invention. The fabric 3 may comprise a natural fabric such as cotton, a synthetic fabric such as polyester or any combination of the two. The fabric 3 may also be woven or non-woven. The process of FIG. 2 may commence with the disposition of an adhesive 2 on the top surface of the elastic material 1 so as to secure the fabric 3 to the elastic material 1. Heat may also be applied so as to secure the fabric 3 to the elastic material 1. In one embodiment, a roll of fabric 3 is unrolled over the top surface of the elastic material 1 so as to cover the top surface of the elastic material 1 with the fabric 3. Next, any extra fabric 3 extending over the edges of the top surface of the elastic material 1 is removed, such as by cutting with a knife 4 or other means for cutting the fabric 3. The result of this step is that the fabric 3 extends solely coextensively over the top surface of the elastic material 1 (se the right-most configuration of FIG. 2).

FIG. 3 is an illustration of the process for applying a graphic 5 to the layer of fabric 3 on the block of elastic material 1, in accordance with one embodiment of the present invention. In this step, a design or graphic image 5 is printed onto the outward facing side of the fabric 3. In one embodiment, one or more silkscreen stencils 6 are applied to the outward facing side of the fabric 3 and one or more silkscreen printable materials (such as ink or plastisol) are applied to the fabric so as to print a design or graphic image 5 onto the outward facing side of the fabric 3. In another embodiment of the present invention, the design or graphic image 5 is printed onto the outward facing side of the fabric 3 using other types of printing technology, such as inkjet printing, letterpress printing, flexographic printing, lithographic printing, digital printing, and offset printing. In another embodiment of the present invention, the image 5 is placed onto the outward facing side of the fabric 3 using other types of technology such as embroidery.

FIG. 4 is an illustration of the process for setting the design or graphic image 5 printed on the layer of fabric 3, in accordance with one embodiment of the present invention. In this step, heat may be applied to elastic material 1 and fabric 3 via an oven or stove 7 so as to set the print or ink comprising the image 5 on the fabric 3. In one embodiment of this step, heat is applied by oven or stove 7 only to the extent necessary to substantially set the print on the layer of fabric 3.

FIG. 5 is an illustration of the process for applying a mold 8 to the block of elastic material 1, in accordance with one embodiment of the present invention. Mold 8 comprises a negative cavity (not shown, since it is facing downwards in FIG. 5) that holds a desired shape. In the example of FIGS. 5-7, the negative cavity of mold 8 holds the shape of the bottom half of a car. In this step, the cavity portion of the mold 8 is pressed against the outward facing surface of fabric 3 and the elastic material 1 using machine press 9 (such as a stamping press), such that a three-dimensional object 10 having an open end is produced. Specifically a three-dimensional object representing the bottom half of a car is produced. Heat may be applied during the molding step to form the elastic material 1 and/or allow it to set into the desired three-dimensional shape 10. Subsequently, extra material protruding from the brim of the open end of the three-dimensional shape 10 is trimmed, such as with a knife 11.

In one embodiment, thermoforming is used to execute the molding process described with respect to FIG. 5 above. Thermoforming is a manufacturing process for a thermoplastic sheet or film, such as elastic material 1. The sheet or film is heated between infrared, natural gas, or other heaters to its forming temperature. Then it is stretched over or into a temperature-controlled, single-surface mold. The sheet is held against the mold surface unit until cooled. The formed part is then trimmed from the sheet. The trimmed material is usually reground, mixed with virgin plastic, and reprocessed into a usable sheet. There are several categories of thermoforming, including vacuum forming, pressure forming, twin-sheet forming, drape forming, free blowing, and simple sheet bending.

With regard to the vacuum-forming process, one may cause a heat-treated sheet of thermoplastic to be sucked against a die in skin-tight conforming relation, and then cooled in that position. Once the plastic has been deformed to the desired three-dimensional shape, it may be removed from the die that was used to deform the plastic, and trimmed.

FIG. 6 is an illustration of the process for coupling one three-dimensional object 10 with another, in accordance with one embodiment of the present invention. FIG. 6 shows that another three-dimensional object 12 having an open end is produced using the same process as described above. Specifically, a three-dimensional object 12 representing the top portion of a car is produced. Note the brim of the open end of the three-dimensional shape 10 is equivalent, or matches up with, the open end of the three-dimensional shape 12. Glue or another adhesive may be applied to the brim of the open end of the three-dimensional shape 10 and/or the brim of the open end of the three-dimensional shape 12. I another embodiment, stitching may be used to combine the open end of the three-dimensional shape 10 with the brim of the open end of the three-dimensional shape 12. Thereafter, the brim of the open end of the three-dimensional shape 10 may be coupled with the brim of the open end of the three-dimensional shape 12 so as to create the three-dimensional object 13 of FIG. 7.

FIG. 8 is an illustration of the final product 13 resulting from coupling one three-dimensional object with another, in accordance with one embodiment of the present invention.

FIG. 8 shows that the manufacturing process of the present invention has produced the three-dimensional shape 10 and the three-dimensional shape 12. FIG. 8 shows that the brim of the open end of the three-dimensional shape 10 may be coupled with one side of a zipper "Z," while the brim of the open end of the three-dimensional shape 12 may be coupled with the other side of the zipper "Z," so as to create the three-dimensional object 13, shown in FIG. 9, which may be a purse, lunchbox or the like. Slider elements "F" are used to open or close the zipper "Z."

FIG. 10 is an illustration of a perspective view of the product 13 of FIG. 8 and FIG. 9. FIG. 10 shows that product 13 may be a lunchbox, purse, bag or luggage item shaped like a car tire and having a car tire graphic imprinted upon its exterior. FIG. 10 also shows that a strap or other carrying accessory "A" may be attached to the product 13.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

I claim:

1. A fabrication method for producing a hollow three dimensional object, comprising:
   disposing a layer of adhesive over a top surface of an elastic material;
   disposing a layer of fabric to the top surface of the elastic material, such that the layer of adhesive secures the layer of fabric to the elastic material;
   applying a silkscreen stencil to the outward facing side of the layer of fabric;
   applying printable material to the outward facing side of the layer of fabric via the silkscreen stencil;
   applying heat to set the printable material to the layer of fabric;
   pressing an inside surface of a mold against the top surface of the printable material, so as to produce a first three-dimensional object having an open end; and
   removing excess elastic material from a rim of the open end of the first three-dimensional object.

2. The method of claim 1, wherein the elastic material comprises a polymer.

3. The method of claim 2, wherein the elastic material comprises EVA.

4. The method of claim 3, wherein the layer of fabric comprises polyester.

5. The method of claim 4, wherein the step of disposing a layer of fabric further comprises unrolling a roll of polyester so as to place a layer of polyester over the top surface of the elastic material.

6. The method of claim 5, wherein the step of disposing a layer of fabric further comprises removing excess fabric from outside edges of the top surface of the elastic material such that the layer of fabric is solely coextensive with the top surface of the elastic material.

7. The method of claim 6, wherein the step of applying a silkscreen stencil further comprises applying a plurality of silkscreen stencils to the outward facing side of the layer of fabric, according to the number of colors to be applied to the layer of fabric.

8. The method of claim 7, wherein the step of applying printable material further comprises applying printable material of a plurality of colors to the outward facing side of the layer of fabric via the plurality of silkscreen stencils.

9. The method of claim 8, wherein the printable material comprises ink.

10. The method of claim 9, wherein the printable material comprises plastisol.

11. The method of claim 1, further comprising applying glue to the brim of the open end of the first three-dimensional object.

12. The method of claim 11, further comprising applying glue to a brim of an open end of a second three-dimensional object having an open end equivalent to the open end of the first three-dimensional object.

13. The method of claim 12, further comprising joining the brim of the open end of the second three-dimensional object with the brim of the open end of the first three-dimensional object.

14. The method of claim 1, further comprising coupling one half of a zipper to the brim of the open end of the first three-dimensional object.

15. The method of claim 14, further comprising coupling one half of a zipper to a brim of an open end of a second three-dimensional object having an open end equivalent to the open end of the first three-dimensional object.

16. The method of claim 15, further comprising joining the zipper on the brim of the open end of the second three-dimensional object with the zipper on the brim of the open end of the first three-dimensional object.

17. The method of claim 1, wherein the step of pressing an inside surface further comprises thermoforming the elastic material.

18. The method of claim 1, wherein the step of pressing an inside surface further comprises vacuum-forming the elastic material.

19. The method of claim 1, wherein the step of pressing an inside surface further comprises pressure-forming the elastic material.

* * * * *